United States Patent [19]

Rolauffs et al.

[11] 4,258,636
[45] Mar. 31, 1981

[54] DEVICE FOR CONTROL OF THE FRAME MOVEMENTS OF AUTOMATIC SEWING MACHINES

[75] Inventors: Hans Rolauffs, Krefeld; Helmut Schäfer, Beuren, both of Fed. Rep. of Germany

[73] Assignee: Maschinenfabrik Carl Zangs Aktiengesellschaft, Krefeld, Fed. Rep. of Germany

[21] Appl. No.: 963,905

[22] Filed: Nov. 24, 1978

[30] Foreign Application Priority Data

Nov. 29, 1977 [DE] Fed. Rep. of Germany ....... 2753087

[51] Int. Cl.³ .............................................. D05B 21/00
[52] U.S. Cl. ................................................. 112/121.12
[58] Field of Search ...................... 112/121.12, 121.11, 112/158 E, 275, 277

[56] References Cited

U.S. PATENT DOCUMENTS

| | | | |
|---|---|---|---|
| 4,050,393 | 9/1977 | Welcher et al. | 112/121.12 |
| 4,073,247 | 2/1978 | Cunningham et al. | 112/121.12 |
| 4,135,459 | 1/1979 | Manabe et al. | 112/121.12 |
| 4,160,422 | 7/1979 | Barber et al. | 112/121.11 |

OTHER PUBLICATIONS

BASF, "Floppy Disc Drive," 4-77, pp. 1-34.

*Primary Examiner*—Peter P. Nerbun
*Attorney, Agent, or Firm*—Martin A. Farber

[57] ABSTRACT

A device for control of the frame movements of embroidery or sewing automatic machines, by which the movements of the frame in the x and y direction are carried out by servomotors. The path information for displacement of the frame in the x and y direction are emitted by a microprocessor control, the latter comprising a central processing unit and a working random access memory, from which memory the path information is recalled on time in dependency on the program of a programmable read only memory and via the central processing unit with the intermediate connection of an input-output port being retransmitted to digital analog converters. The converters are connected with direct current motors of the frame via power units, the latter operating as amplifiers.

8 Claims, 1 Drawing Figure

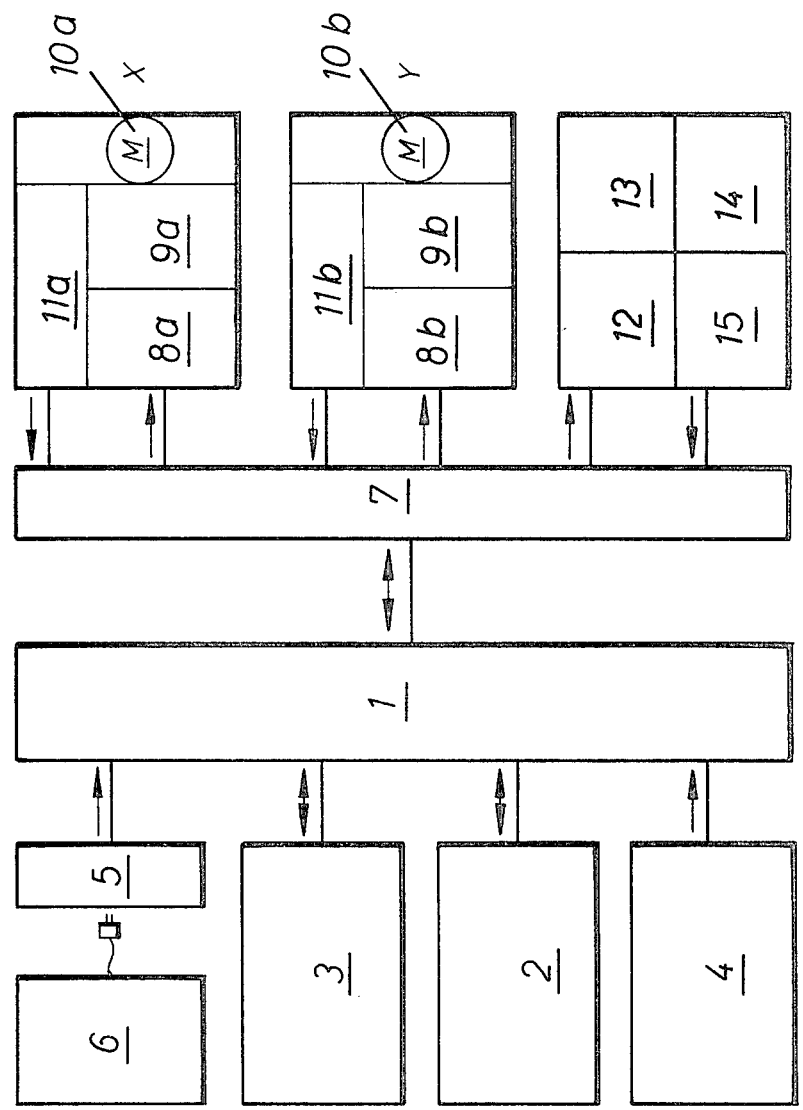

DEVICE FOR CONTROL OF THE FRAME MOVEMENTS OF AUTOMATIC SEWING MACHINES

The invention relates to a device for control of the frame movements of embroidery or sewing automatic machines, by which the movements of the frame in the x and y direction are carried out by servomotors.

With embroidery and sewing automatic machines the frames for the formation of the design, which frames carry the goods to be worked, is moved back and forth in the coordinates x and y according to the instructions (informations) under the stationarily mounted needles with approximately 300 shiftings per minute, the information being mechanically scanned or sensed step by step from a punched band. On the basis of the technically limited possibility for the reception of endless perforation bands, the largest number of recordable information is approximately 25,000. The partial very long perforated bands are endlessly stack together for repeated runs and so-called endless card cycles are stored on supply reels, so that a continuous production of embroidery or sewing motifs is possible. When the perforated card has run through, the embroidery and sewing automatic again begins at the start of the pattern or design. After removing the embroidered or sewed surface creations, it is therefore necessary to clamp the following goods to be processed. This means in other words that a full passage of the perforated band takes place per surface creation. The sensing or scanning of the punched band, which establishes the displacement magnitudes, particularly with embroidery lengths, and the execution of the displacement takes place purely mechanically with most of the present embroidery and sewing machines.

With new systems instead of the conventional, comparatively wide and mechanically very resistable punched cards for control of the embroidery and sewing automatic machines, so-called eight track punched tapes are used, which punched tapes are known in other fields of art. In this manner the x and y displacement information is read for example with photodiodes. The read values are fed to a processor, which processes stepping pulses and further redirects them to stepping motors for the x and y movement of the frame. With these known displacement devices which are controlled by stepping motors, embroidery and sewing speeds, respectively, of approximately 600 stitches per minute are attained.

The limited working speed of the previously described embroidery and sewing automatic machine controls are disadvantageous, as well as the limited number of embroidery information which is storable in the punched bands, the expensive production and duplication of the information carrier, the spacial intensive mounting and the limited durability of the punch bands and the eight track punch tapes. The punch bands and the punched tapes must be exchanged or replaced many times with a large number of runs. In the case that several embroidery and sewing automatic machines, respectively, must process the same design, for each of these automatic machines a separate information carrier is produced by copying the original information carrier. Moreover insertion, exchange and other manipulations of the punch bands and punched tapes, respectively, require great care, since damage to the information carrier, and under circumstances to the erroneous embroidery or stitching under the circumstances, leads to expensive articles. Finally the information carriers are sensitive to moisture, and under certain climatic conditions only with large expense are stable to store to some extent.

The invention is based on the task to made a device for control of the frame movements of embroidery and sewing automatic machines of the introductory described type, which, while avoiding the previously described disadvantages, produces a simple and operationally sure control of the production of the embroidery or sewing design.

The solution of this task by the invention is characterized in the manner that the path information for displacement of the frame in the x and y direction is emitted by a microprocessor control, the latter comprising a central processing unit and a working memory (random access memory), from the latter the path information being recalled or read back on time according to schedule in dependency on the program of a programmable read only memory and by means of the central processing unit with the intermediate connection of an input-output- unit are further sent to the digital analog converters, which converters are connected via the power units with the servomotors (direct current motors) of the frame, the power units acting as force amplifiers.

According to a further feature of the invention a special function memory (programmable read only memory for special functions) is coordinated to the central processing unit via a receiver for special function information, the latter being connected with the drives of the embroidery or sewing automatic machine via at least one power unit, which drives carry out the special functions.

A further proposal in accordance with the invention resides in that a total program memory (random access memory) is connected to the central processing unit, in which memory the entire information of an embroidery or sewing program is fed in by means of an input-port before the start of an operating process, the input port being coordinated to the processing unit, and from which memory the individual information is transmitted in sections to the working memory (random access memory), as well as under the circumstances if necessary to the programmable read only memory for special functions, from which memories the information is recalled (read back) on time, separately by means of the sequence of operation programmable memory (programmable read only memory) and is fed to the central processing unit for further processing.

The device according to the invention compared to the known devices and method has many advantages. Thus for example by the programmable data memory of the microprocessor control of the invention only a onetime programming is necessary before each beginning of operation of an embroidery or sewing operation, which programming can be performed particularly by means of modern magnetic data carriers. The single read-in program can frequently be repeated endlessly without an information carrier constantly running along therewith for this purpose and thereby wearing out. The modern magnet data carriers are exceptionally resistable against environmental influences; moreover they can be transported quickly and advantageously in cost over long distances, for example, by normal postal conveyance. Also the storage of the original data carrier which is used from time to time under the circumstances can take place in the most exceptional space saving manner.

Further advantages of the device in accordance with the invention are to be seen in that most routinely trained service personnel, during running of the program after the one-time reading-in of the program data, no longer must be concerned with a sensitive and, wearprone program carrier. As soon as the read-in program is terminated, it automatically again is at the beginning of the program so that the embroidery or sewing process, respectively, can be started again. From a technical view the programmed data memory of microprocessor control can also be brought to relatively high memory volumes, so that the limitation results exclusively with respect to the economy of memories with high memory capacities. By use in the accordance with the invention of the total program memory, from which parts of the program are taken over in stages or sections into the working memory (random access memory), for the other memories of the microprocessor control, there can be used memories with comparatively small memory volumes, whereby the possibility exists to stepwise enlarge modular or building block-like the memory capacity of the total program memory (random access memory) corresponding to the current purpose of use.

According to a further feature of the invention to floppy data carrier for reading an original data carrier is connected to the input port, the original data carrier containing the entire information of an embroidery or sewing program. The existence of the original data carrier is thus merely required before the beginning of the actual working process. This original data carrier is thus available for use after the transmission of the information for the entire program (which information is stored in it) to the total program memory (random access memory) of the embroidery and sewing automatic machines for the programming of other embroidery and sewing automatic machines.

If according to a further feature of the invention the floppy data carrier is connected to the input port only for the time of the transmission of the entire information of the original data carrier to the total program memory (random access memory), with a floppy data carrier different embroidery and sewing automatic machines, respectively, can be programmed one after the other.

A further formation in accordance with the invention resides in that by means of incremental or absolute measuring systems, and respectively, a feedback device for the feedback of the frame displacement movements and special functions, respectively (which are executed in the x and y direction), a closed control circuit is formed on the central processing unit. Instead of a simple control, consequently a complete control occurs which monitors the execution of the stored information.

For a preferred formation, with the invention it is finally proposed, to form the servomotors for the performance of the frame movement in the x and y direction as special direct current motors with high moment of rotation and short reaction time, whereby the working speed of the embroidery and sewing automatic machines may further increase.

In the drawing a block schematic diagram of the device in accordance with the invention is illustrated on the basis of which the construction and the function of the device is to be described.

The invention includes a central processing unit 1, which is connected with a total program memory (random access memory) 2 as well as a working memory (random access memory) 3. In addition to both of these RAM memories, a sequence of operation program memory 4 is coordinated to the central processing unit 1, this memory 4 being formed as programmable read only PROM memory.

Via one input port 5 which is coordinated to the central processing unit 1, a floppy unit or deck 6 for the original data carrier can be connected with the central processing unit 1. The original data carrier which is formed, for example, as a magnetic tape or magnetic plate or disc contains the entire instructions of the embroidery or sewing program. By a momentary or short-time connection of the floppy unit 6 to the input port 5, the entire information in the original data carrier can be transmitted by means of the central processing unit 1 into the total program memory (random access memory) 2. The capacity of this total program memory (random access memory) 2 can be adapted or adjusted by means of a modular or building block-like expansion to the prevailing requirements of the embroidery or sewing automatic machines.

From the total program memory (random access memory) 2, partial instructions (information) corresponding to the running of the working program are transmitted in sections to the working memory (random access memory) 3. From the latter, the individual instructions (information) can be fed on time by means of the sequence of operation program memory (programmable read only memory) 4 to the central processing unit 1.

For retransmission of these individual instructions to the different drives or transmissions of the embroidery and sewing automatic machines, an input-output port 7 is coordinated to the central processing unit 1. Two digital-analog converters 8a and 8b are connected to this input-output port 7. These converters with the intermediate connection of a power unit (direct current amplifier) 9a and 9b, respectively, are connected with the servomotors 10a and 10b for the performance of the displacement movements of the frame in the x and y direction. With a preferred embodiment the servomotors 10a and 10b are constructed as special direct current motors with high torque and short reaction time. The digital-analog converters 8a and 8b control the power units of the direct current (DC) supply for these servomotors 10a and 10b. Each, one incremental or absolute measuring system 11a and 11b, respectively, for the servomotors 10a and 10b takes care of the feedback of the displacement path of the frame, which feedback is required during a control, whereby the signals of these incremental or absolute measuring systems 11a and 11b moreover proceed via the input-output port 7 to the central processing unit 1.

The special functions which are required with almost every embroidery or sewing automatic machine, such as, for example, thread change, thread cut and stop functions, are stored in a special function memory (programmable read only memory for special functions) 13. They are fed from the original data carrier via the input port 5, the central processing unit 1 and the input-output port 7 to a receiver 12 for special function information, which receiver is preconnected to the special function memory 13 (the programmable read only memory for the special functions). Corresponding to the information or instructions from the sequence of operation program memory (programmable read only memory) 4, the information for the special functions are fed from the programmable read only memory 13 for special functions at least to one power unit 14 for special functions, which power unit in turn controls the corresponding drives or transmissions of the embroidery and sewing automatic machines, respectively. In most cases it deals with several different drives, so that several power units 14 are controlled by the programmable read only memory 13 for special functions. Also a feedback device 15 is coordinated to the power units 14 for special functions, which feedback device announces the executed special functions via the input-output port 7 of the central processing unit 1, so that also with respect to the special functions a complete control occurs.

By the use of special motors, e.g. direct current disc rotor motors with high starting torque and quick reaction times, over 1000 displacements per minute and displacement paths of approximately 13 mm in the x and y direction are possible, so that compared to the known displacement drives, a considerable power or performance increase results. Simultaneously higher masses can be displaced than with the previously known, mechanical embroidery and sewing machines or embroidery and sewing machines which are controlled by stepping motors. By coaxial flange-mounting of hydraulic torque amplifiers, furthermore it is possible to considerably increase the size of the masses to be shifted. The conversion of the rotating drive movements of the servomotors 10a and 10b into linear displacement steps takes place by means of known components, such as for example ball circulating spindle drives or gearings. For the production of linear movements (which are low in oscillation) in the x and y direction, the displacement transmissions or drives act or engage as precisely as possible in the plane of the center of gravity of the frame, which frame is formed as a clamping or work holding device.

While it is possible to arrange the floppy unit 6 with the original data carrier fixed inside of the previously described microprocessor control, a further simplification as with the illustrated embodiment example is that the floppy unit 6 can be disconnected from the input port 5. In this case with one and the same floppy unit 6 several embroidery or sewing automatic machines can be programmed, so that not only the original data carrier, but also the floppy unit 6 can be used for the successive programming of several embroidery end sewing automatic machines, respectively.

Herein the term microprocessor means a microcomputer.

We claim:

1. A device for control of the frame movements of embroidery machines, comprising
   a servomotor means for moving a workpiece frame in the x and y directions, respectively
   a computer means for controlling each of said servomotor means via a finished prepared program stored in a data carrier,
   microprocessor control means for transmitting path information for controlling the frame movements in the x and y directions, said microprocessor control means comprising a central processing means and a working memory,
   a programmable read only memory means for recalling the path information from said working memory on time in dependency on a program of said programmable read only memory means,
   digital-analog converters,
   an input-output port connected between said central processing means and said digital-analog converters, said central processing means for retransmitting the recalled path information via said port to said digital analog converters,
   power units constituting force amplifiers being connected to said servomotor means, respectively,
   said digital-analog converters being connected to said power units, respectively.

2. The device according to claim 1, further comprising
   a receiver for special functions is operatively connected to said central processing means,
   a programmable read only memory for special functions is operatively connected to said central processing means via said receiver for special function information,
   at least one power unit means for connecting said receiver with drives of the automatic machines which carry out the special functions.

3. The device according to claim 1, further comprising
   a total program random access memory means is connected to said central processing means for receiving entire information of an embroidery program,
   another programmable read only memory for special functions,
   said central processing means for receiving the recalled information,
   an input port means for reading the entire information of the embroidery program before the beginning of an operating process into said total program random access memory means, said input port means is connected to said central processing means,
   said total program random access memory means transmitting individual information therein in sections to said working memory, said programmable read only memory means for recalling the information at the exact time according to program from said working memory for feeding the recalled information to said central processing unit for further processing.

4. The device according to claim 3, further comprising
   a floppy data carrier means for reading an original data carrier containing the entire finished prepared information of the embroidery program which is connected to said input port means.

5. The device according to claim 4, wherein
   said floppy data carrier means for being connected to said input port only during a time of transmission of the entire informations of the original data carrier to said total program random access memory means.

6. The device according to claim 1, further comprising
   incremental measuring means for said servomotor means, and respectively,
   feedback means connected to said measuring means for feeding back the frame displacement movements and special functions, respectively, which are performed in the x and y direction to said central processing unit,
   a closed loop control circuit is formed on said central processing means, said control circuit includes said measuring means and said feedback means.

7. The device according to claim 1, wherein
   said servomotor means for moving the frame in the x and y directions, respectively, constitute direct current—disc rotor motors with high torque and quick reaction time.

8. The device according to claim 3, wherein
said total program random access memory means is further for transmitting individual information therein in sections to said another programmable read only memory for special functions, and
said programmable read only memory means is for recalling the information at the exact time according to program separately from said working memory and from said another programmable read only memory for special functions for feeding the recalled information to said central processing unit for further processing.

* * * * *